United States Patent [19]

Futagami et al.

[11] Patent Number: 5,475,709
[45] Date of Patent: Dec. 12, 1995

[54] ADJACENT AND ALTERNATE CHANNELS POWER MEASUREMENT APPARATUS

[75] Inventors: Yoshihiro Futagami, Kawasaki; Toshiyuki Matsuda, Ono, both of Japan

[73] Assignee: Anritsu Corporation, Tokyo, Japan

[21] Appl. No.: 243,587

[22] Filed: May 16, 1994

[30] Foreign Application Priority Data

May 17, 1993 [JP] Japan .................................... 5-139015

[51] Int. Cl.[6] ............................ H04B 3/46; H04B 17/00; H04B 1/20
[52] U.S. Cl. ............................. 375/224; 370/13; 370/17; 455/67.1
[58] Field of Search ....................... 375/10, 224; 370/13, 370/17; 455/226.1, 67.1, 67.3

[56] References Cited

U.S. PATENT DOCUMENTS

| 4,317,206 | 2/1982 | Nossen | 455/67.3 |
|---|---|---|---|
| 4,408,322 | 10/1983 | Chadwick et al. | 370/17 |
| 4,606,019 | 8/1986 | Takai | 370/13 |
| 4,932,075 | 6/1990 | Dmitrijevic et al. | 455/67.1 |
| 5,303,262 | 4/1994 | Johnson | 375/10 |

OTHER PUBLICATIONS

IEC Standard Publication 489–2; "Methods of Measurement for Radio Equipment Used in the Mobile Services"; 1978; Geneva, Switzerland; pp. 25, 27.

EIA/TIA Interim Standard; "Recommended Minimum Performance Standards for 800 MHz Dual Mode Mobile Station"; Dec. 1991.

μ PD77240 Digital Signal Processor (DSP) User's Manuals; NEC Corporation; 1990).

*Primary Examiner*—Stephen Chin
*Assistant Examiner*—Jeffrey W. Gluck
*Attorney, Agent, or Firm*—Frishauf, Holtz, Goodman, Langer & Chick

[57] ABSTRACT

A signal processing unit selects signal components included in the frequency bands of respective channels from a burst signal input from a terminal, and outputs the selected signal components to a memory after they are converted into digital data. A frequency switching unit sequentially switches the frequency bands at a predetermined time interval in correspondence with the respective channels. A data write unit stores the digital data in the memory for every channel in response to switching of the frequency bands. A data read-out unit reads out data from the memory, specifies the timing of the burst signal, and reads out necessary data for every channel on the basis of the specified timing. A power arithmetic operation unit calculates electric power of each channel based on the readout data, thus obtaining the adjacent and alternate channels power.

11 Claims, 7 Drawing Sheets

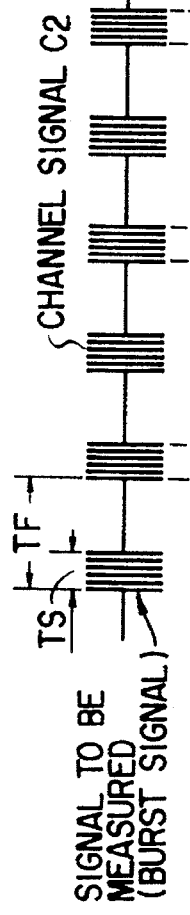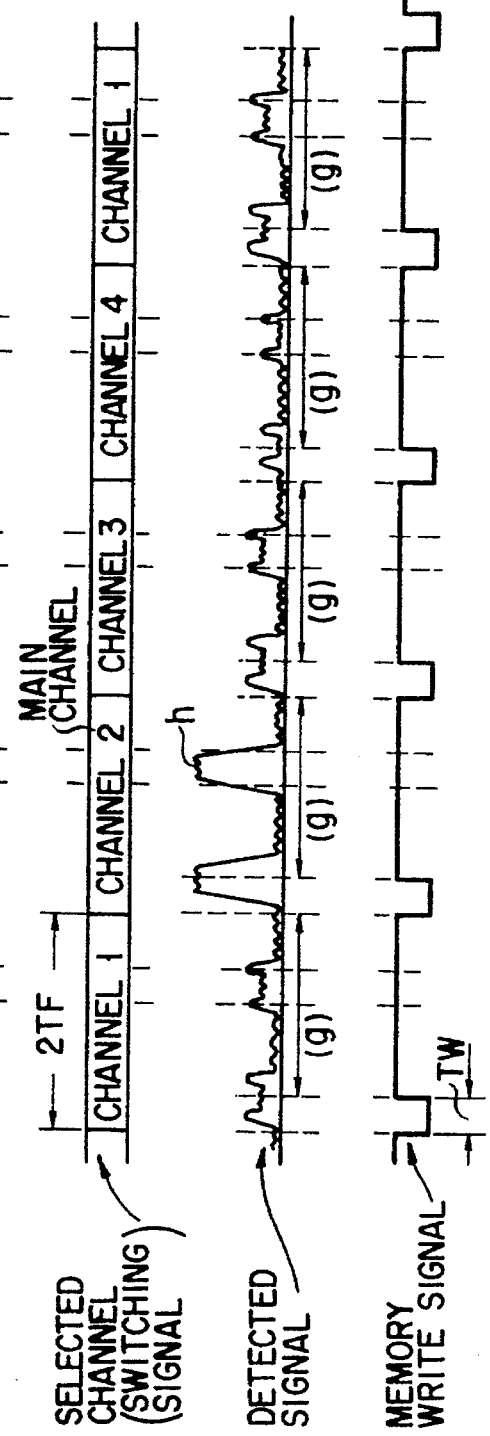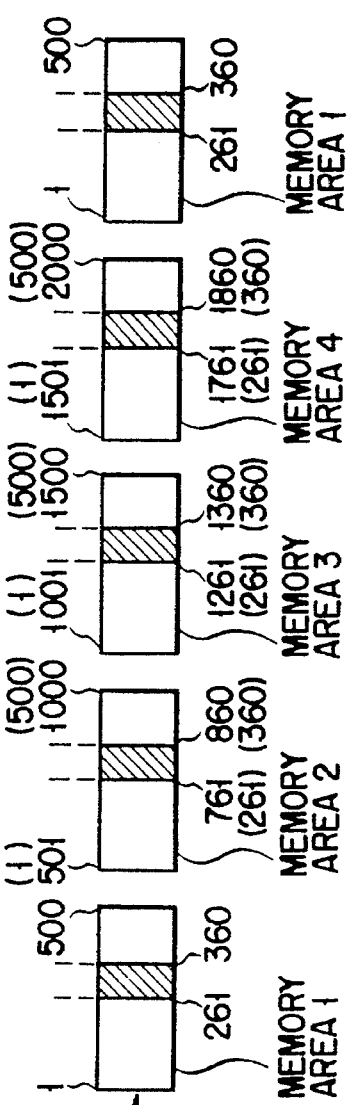

FIG. 12A  SIGNAL TO BE MEASURED (BURST SIGNAL) 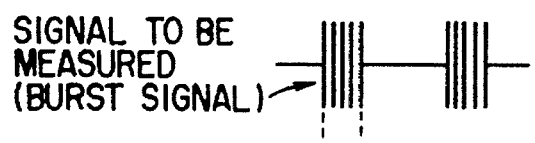
FIG. 12B  CHANNEL 1 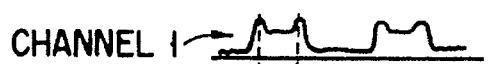
FIG. 12C  CHANNEL 2 
FIG. 12D  CHANNEL 3 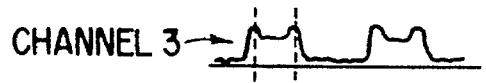
FIG. 12E  CHANNEL 4 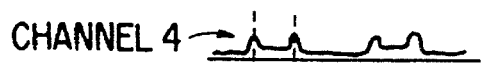
} DETECTED SIGNAL
FIG. 12F  MEMORY AREAS 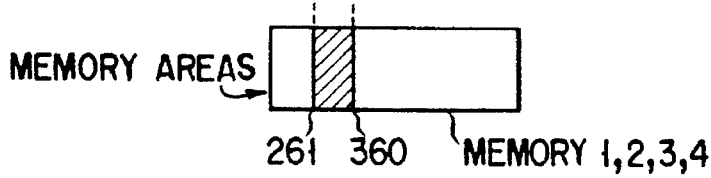
261  360   MEMORY 1,2,3,4

ADJACENT AND ALTERNATE CHANNELS POWER MEASUREMENT APPARATUS

BACKGROUND OF THE INVENTION

1. Field of the Invention

The present invention relates to an adjacent and alternate channels power measurement apparatus and, more particularly, to an adjacent and alternate channels power measurement apparatus for measuring adjacent and alternate channels power in TDMA (time-division multiple access) communications using a burst signal.

2. Description of the Related Art

As digital communication systems using TDMA communications, the PDC system (Japan digital mobile telephones), the NADC system (U.S. digital mobile telephones), the GSM system (Europe digital mobile telephones), the PHP system (Japan digital cordless telephones), and the like are known.

A digital communication system has a plurality of channels to perform transmission/reception of data between a base station and a plurality of mobile stations. For example, as shown in FIG. 5, channels 1, 2, 3, and 4 which respectively have center frequencies F1, F2, F3, and F4, and a frequency bandwidth AF are assigned.

A communication between the base station and a given mobile station is performed using a burst-pattern signal (to be referred to as a burst signal hereinafter) which is turned on and off at a predetermined time interval. For example, a burst signal in which a duration ($T_S$) including a carrier C and a duration ($T_F$–$T_S$) including no carrier repetitively appear at a predetermined time interval ($T_F$) is used, as shown in FIG. 4.

In such a communication system, a wide distribution of the spectrum characteristics of a channel signal in each channel may adversely influence other channels, and may pose problems.

More specifically, when the distribution of the spectrum characteristics of a carrier (to be referred to as the carrier of a main channel) of a specific channel (a channel having the carrier frequency of a signal to be measured; to be referred to as a main channel hereinafter) is broad, the electric power of the carrier of the main channel leaks to adjacent and alternate channels, and appears as noise in these channels. For this reason, it becomes difficult for the receiving side of each of the adjacent and alternate channels to separate the leakage carrier of the main channel and to receive only the carrier of the own channel.

FIG. 5 shows an example of a wide distribution of the spectrum characteristics of a carrier C2 (the carrier of the main channel) of channel 2 (main channel). In this case, leakage of the spectrum characteristics (b) to channels 1, 3, and 4 (adjacent and alternate channels) is larger than that of the spectrum characteristics (a), and adversely influences these channels.

Therefore, in order to prevent the above-mentioned problem, the transmitting side of each channel must limit the distribution of the spectrum characteristics of a channel signal included in the burst signal.

For this purpose, a measurement apparatus which receives the carrier of each channel, and can quantitatively measure the distribution of the spectrum characteristics of the received carrier as adjacent and alternate channels power is required.

As a conventional measurement apparatus for measuring the adjacent and alternate channels power, an apparatus described in, e.g., IEC STANDARD.Publication 489-2, 1978, which measures a continuous signal in place of a burst signal, is known.

FIG. 6 is a block diagram showing this prior art.

A signal to be measured (continuous signal) input from a terminal 1 is mixed with a local signal from a local oscillator 22 by a mixer 21, and is converted into an IF signal of a predetermined frequency. The bandwidth of the IF signal is limited by a bandpass filter 23 having prescribed bandpass characteristics (bandwidth ΔF). Thereafter, the IF signal is envelope-detected by a level detector 24. The detected signal is converted into digital data by an A/D converter 25, and the digital data is input to a power arithmetic operation unit 4. A frequency switching unit 3 switches and sets the frequency of a local signal to be output from the local oscillator 22, and outputs the switching information to the power arithmetic operation unit 4. Note that the frequency of the local signal to be output from the local oscillator 22 varies depending on a channel to be selected.

The power arithmetic operation unit 4 calculates a time average of the levels of the digital data on the basis of the digital data of the detected signal output from the A/D converter 25, thus calculating electric power for every channel. Note that the mixer 21, the local oscillator 22, the bandpass filter 23, the level detector 24, and the A/D converter 25 constitute a signal processing unit 2.

The frequency setting method of the local oscillator 22 and the waveform of the frequency component of each channel selected by the bandpass filter 23 will be described below with reference to a case wherein a continuous signal of the carrier C2 having the spectrum characteristics (b) shown in FIG. 5 is input as a signal to be measured.

In order to select the frequency component of a given channel from a signal to be measured shown in FIG. 7A (the carrier C2 including the frequency components of channels 1 to 4), a frequency higher (or lower) by an IF frequency (F0) than the center frequency (F1 to F4) of the channel is set in the local oscillator 22. For example, in the case of channel 2, a frequency F2+F0 (or F2–F0) is set. As a result, even when the frequency band (channel) to be selected is changed in turn, the center frequency of the IF signal output from the mixer 21 can be a constant frequency (F0).

FIGS. 7B, 7C, and 7D respectively show the waveforms of IF signals of the respective channels selected by the bandpass filter 23. As can be seen from FIGS. 7B, 7C, and 7D, the waveform level of each channel corresponds to the level of the spectrum characteristics of each channel. Upon reception of the detected signal (digital data) corresponding to the waveform level, the power arithmetic operation unit 4 calculates a time average, thus calculating electric power for every channel.

In this case, since channel 2 is the main channel, electric power calculated for each of channels 1, 3, and 4 will be referred to as adjacent and alternate channels power hereinafter.

However, when the adjacent and alternate channels power of the above-mentioned burst signal is measured using the above-mentioned conventional measurement apparatus, the following problems are posed.

When a burst signal which is shown in FIG. 8A and has the spectrum characteristics (b) in FIG. 5 is input as a signal to be measured, the waveforms of the detected signals of the respective channels which are envelope-detected by the level detector 24 and are output therefrom are as shown in FIGS. 8B, 8C, and 8D.

More specifically, upon turning on/off (corresponding to (c) in FIG. 8B) of the carrier C2, large power ((d) in FIGS. 8C and 8D) is generated in the adjacent and alternate channels. In a predetermined period ((e) in FIG. 8B) of an ON duration as well, the adjacent and alternate channels power ((f) in FIGS. 8C and 8D) is generated. The former power (d) will be referred to as a peak value of the adjacent and alternate channels power hereinafter, and the latter power (f) will be referred to as a steady value of the adjacent and alternate channels power hereinafter.

It is required for the adjacent and alternate channels power generated as described above that the peak value and the steady value be separately evaluated (for example, the standards of U.S. digital mobile telephones; EIA/TIA/IS-55 December 1991).

However, in the above-mentioned measurement apparatus for a continuous signal, i.e., the conventional technique for calculating electric power as a time average of the detected signal (digital data), it is impossible to separately measure the peak value and the steady value of the power.

SUMMARY OF THE INVENTION

It is, therefore, an object of the present invention to provide a new and improved adjacent and alternate channels power measurement apparatus which can separately measure a peak value of adjacent and alternate channels power generated in a leading/trailing edge portion of a burst signal to be measured, and a steady value of the adjacent and alternate channels power generated in a predetermined period of an ON duration of the burst signal.

According to an aspect of the present invention, there is provided an adjacent and alternate channels power measurement apparatus, which receives a burst signal in which ON and OFF durations of a modulated carrier repetitively appear at a predetermined time interval, and measures electric power present in a predetermined frequency band having, as the center, a frequency of at least one of adjacent and alternate channels which are assigned at a predetermined frequency interval from a carrier frequency, comprising:

a signal processing unit for receiving the burst signal, converting, into digital data, signal components which are present in the predetermined frequency bands to have, as centers, frequencies of corresponding channels in a channel of the carrier frequency and the adjacent and alternate channels from the burst signal, and outputting the digital data;

a memory for storing the digital data output from the signal processing unit;

data write means for storing the digital data in memory areas of the memory, which are allocated in advance, in correspondence with the channel of the carrier frequency and the adjacent and alternate channels;

data read-out means for reading out the digital data from the memory area, corresponding to the channel of the carrier frequency, of the memory areas, detecting a timing of a burst indicating an ON duration of the burst signal as memory address information, and reading out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by the data read-out means, and calculating electric power for every channel.

More specifically, in order to achieve the above object, according to the present invention, digital data of a channel having the carrier frequency (main channel) and adjacent and alternate channels, which are selected from a burst signal by the signal processing unit and are output therefrom, are temporarily stored in memory areas of the corresponding channels, which are allocated in advance. The digital data is read out from the memory area of the main channel, the ON/OFF timing of the burst signal is specified as memory address information, and memory addresses corresponding to a peak value and a steady value of adjacent and alternate channels power are specified on the basis of the memory address information in units of adjacent and alternate channels. Digital data are read out from specified memory addresses, and the peak value and the steady value of the adjacent and alternate channels power are calculated for every channel.

In order to select a signal component of each channel from the burst signal, the frequency band of the signal processing unit is switched by the frequency switching means at a predetermined time interval. For example, the frequency band of the signal processing unit is switched at a time interval which includes at least one ON duration of the burst signal. As a result, digital data of the respective channels selected from the burst signal are output from the signal processing unit.

The digital data of the respective channels are sequentially written in the memory areas of the corresponding channels, which are allocated in advance, by the data write means. As a result, digital data, corresponding to the ON duration of the burst signal, of the respective channels are stored at the same relative memory address in the respective memory areas.

The data read-out means reads out data from the memory area of the main channel, and detects a timing of a burst indicating the ON duration of the burst signal as memory address information. Based on the memory address information of the timing of the burst, the memory address of the ON duration of the burst signal can be specified in each of the memory areas of the adjacent and alternate channels in the same manner as the main channel.

More specifically, this processing is achieved by paying attention to the fact that it is difficult to detect the ON/OFF timing of the burst signal from data of the adjacent and alternate channels with low levels, but it is easy to detect the ON/OFF timing of the burst signal using data of the main channel with the highest level.

Then, digital data necessary for calculating electric power of each channel is read out from each memory area on the basis of the memory address information of the burst timing, and is output to the power arithmetic operation means. At this time, since data can be read out from the memory area portions corresponding to the peak value and the steady value of the adjacent and alternate channels power for every channel, the peak value and the steady value of the leakage power can be separately measured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 9A, 9B, 9C, 9D, and 9E are timing charts showing the operation states of respective units of the present invention;

FIGS. 12A, 12B, 12C, 12D, 12E, and 12F are timing charts for explaining the operation of the embodiment shown in FIG. 11.

DETAILED DESCRIPTION OF THE PREFERRED EMBODIMENTS

Figure 1:
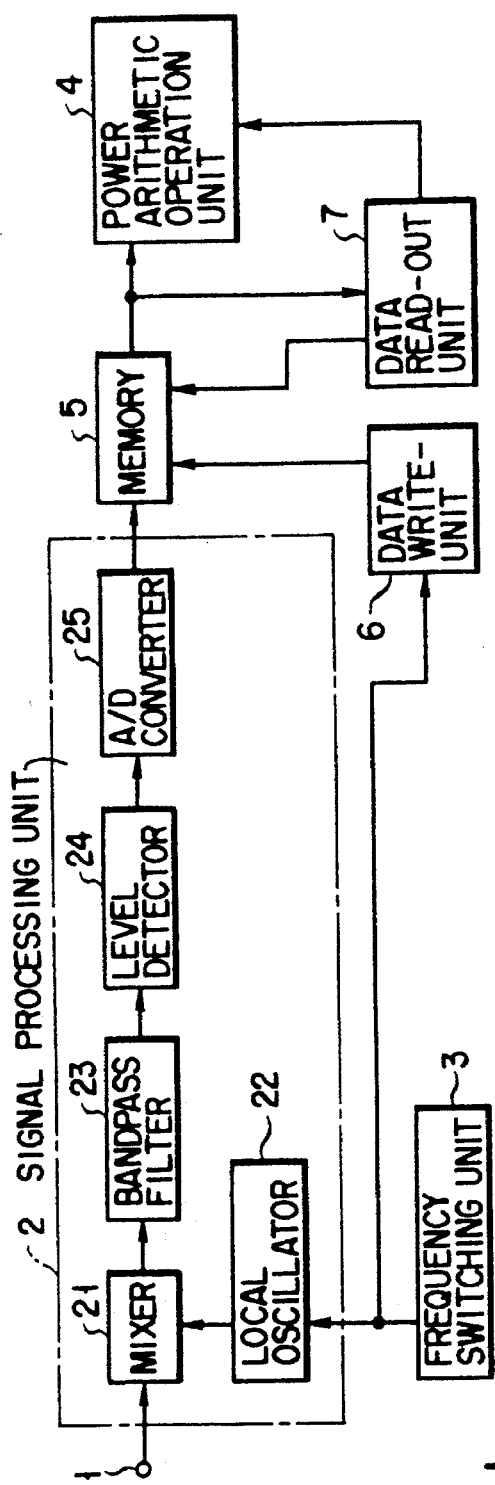
FIG. 1 is a block diagram showing the schematic arrangement of an adjacent and alternate channels power measurement apparatus according to an embodiment of the present invention.

Reference will now be made in detail to the presently preferred embodiments of the invention as illustrated in the accompanying drawings, in which like reference characters designate like or corresponding parts throughout the several drawings.

An embodiment of the present invention will be described below with reference to the accompanying drawings.

Figure 6:
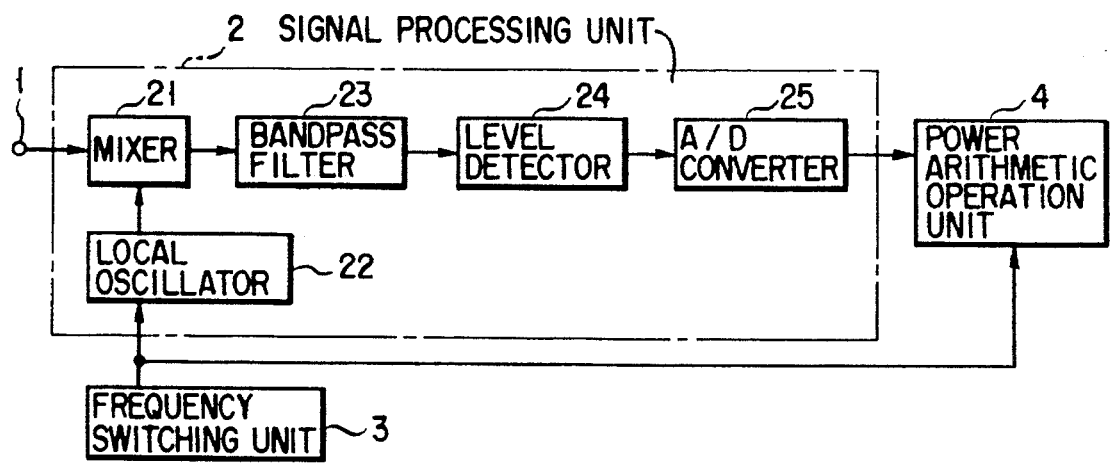
FIG. 6 is a block diagram showing a prior art.
Figure 7A:
FIGS. 7A, 7B, 7C, and 7D are waveform charts showing the waveforms of IF signals of respective channels when a signal to be measured is a continuous signal.
Figure 7B:
Figure 7C:
Figure 7D:

FIG. 1 is a block diagram showing the schematic arrangement of an adjacent and alternate channels power measurement apparatus according to an embodiment of the present invention. Note that the same reference numerals in FIG. 1 denote the same parts as in the prior art shown in FIG. 6.

Figure 5:
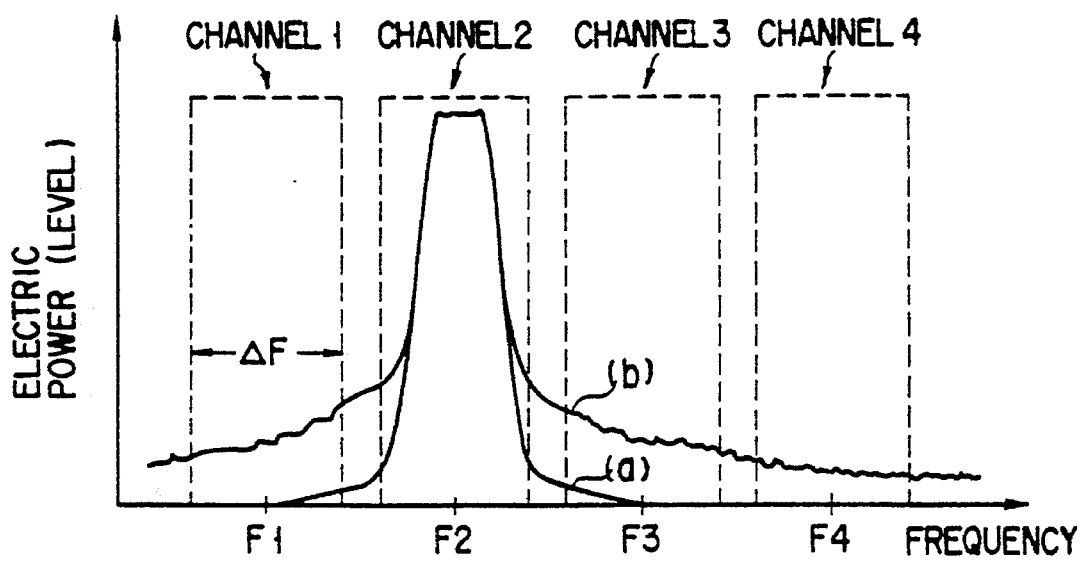
FIG. 5 is a graph showing the frequency bands of a plurality of channels and the spectrum characteristics of a channel signal.

The description of the embodiment will be given with reference to a case wherein a burst signal which is shown in FIG. 9A and has the spectrum characteristics (b) in FIG. 5, is input as a signal to be measured.

A signal to be measured, i.e., a burst signal of a carrier C2 which includes the frequency components of channels 1 to 4, is input to a signal processing unit 2 via a terminal 1.

The signal processing unit 2 comprises a mixer 21, a local oscillator 22, a bandpass filter 23, a level detector 24, and an A/D converter 25. The unit 2 selects the signal components of a main channel (channel 2) and adjacent and alternate channels (channels 1, 3, and 4) from the burst signal at a predetermined time interval, and outputs them to a memory 5 after the signal components are converted into digital data.

More specifically, the mixer 21 mixes the burst signal with a local signal from the local oscillator 22 to convert it into an IF signal of a predetermined frequency. At this time, the frequency of the local signal varies depending on a channel to be selected, as has been described in the prior art, and is switched by a frequency switching unit 3 at a predetermined time interval. For example, the frequency is switched in the order of channel 1, channel 2, channel 3, and channel 4 at a time interval $2T_F$ (twice a period $T_F$ of the burst signal) which includes at least one ON duration of the burst signal, as shown in FIG. 9B.

The bandpass filter 23 has prescribed bandpass characteristics defined by a communication system, and limits the bandwidth of the IF signal output from the mixer 21. The level detector 24 comprises a diode, a capacitor, and the like, and envelope-detects the IF signal from the bandpass filter 23. The detected signal output from the level detector 24 has a waveform shown in, e.g., FIG. 9C. The A/D converter 25 converts the detected signal into digital data, and outputs the digital data to the memory 5.

The frequency switching unit 3 supplies a switching signal for sequentially switching the channels in the order shown in FIG. 9B to the local oscillator 22 and a data write unit 6.

Upon reception of the channel switching signal, the data write unit 6 sequentially stores data corresponding to (g) in FIG. 9C of the digital data output from the A/D converter 25 in predetermined memory areas of the memory 5 after $T_W$ as a time long enough to switch the frequency of the local oscillator 22, as shown in FIG. 9D.

More specifically, as shown in FIG. 9E, data of channel 1 is stored in memory area 1 (addresses 1 to 500), data of channel 2 is stored in memory area 2 (addresses 501 to 1,000), and so on. Note that numerals in FIG. 9E represent memory addresses, and numerals in parentheses represent relative memory addresses.

As a result, the digital data of the respective channels corresponding to the ON durations of the burst signal are stored at the same relative memory address in the respective memory areas, as shown in FIG. 9E. For example, when data of channel 1 is stored at addresses 261 to 360 in memory area 1, data of channel 2 is stored at addresses 761 to 860 (relative addresses 261 to 360) in memory area 2, and data of channels 3 and 4 are similarly stored at addresses (relative addresses) 261 to 360 in memory areas 3 and 4.

Therefore, if the ON duration of the burst signal can be specified based on data in a memory area of a certain channel, the ON durations of the remaining channels can also be specified. Since the burst signal (FIG. 9A) is asynchronous with switching of the frequency of the local oscillator 22 (FIG. 9B), the memory address indicating the ON duration of the burst signal is not always the same address.

Upon completion of the write access to the memory 5, a data read-out unit 7 reads out data from memory area 2 of channel 2 (main channel), detects a memory address where data corresponding to (h) in FIG. 9C is stored, and determines the detected address to be a timing of a burst indicating the ON duration of the burst signal. For example, in the case of FIG. 9E, addresses 761 to 860 (relative addresses 261 to 360) correspond to the timing of the burst. Therefore, in memory areas 1, 3, and 4 as well, relative addresses 261 to 360 correspond to the ON duration of the burst signal.

Figure 8A:
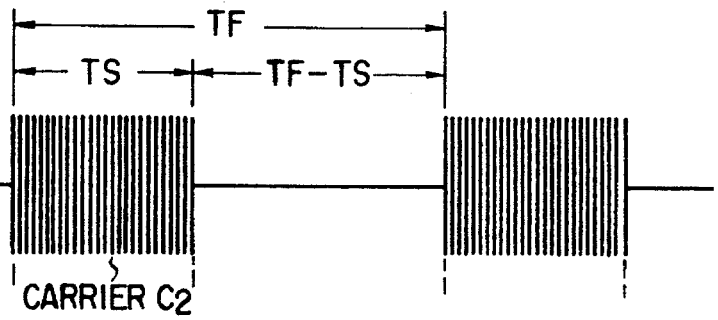
FIGS. 8A, 8B, 8C, and 8D are waveform charts showing the waveforms of detected signals of respective channels when a signal to be measured is a burst signal.
Figure 8B:
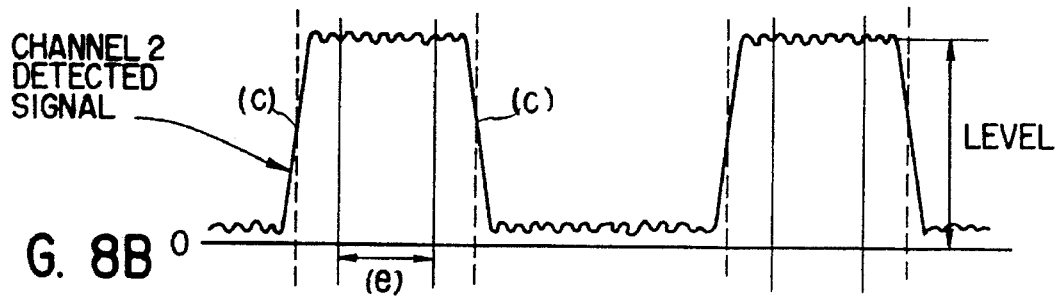
Figure 8C:
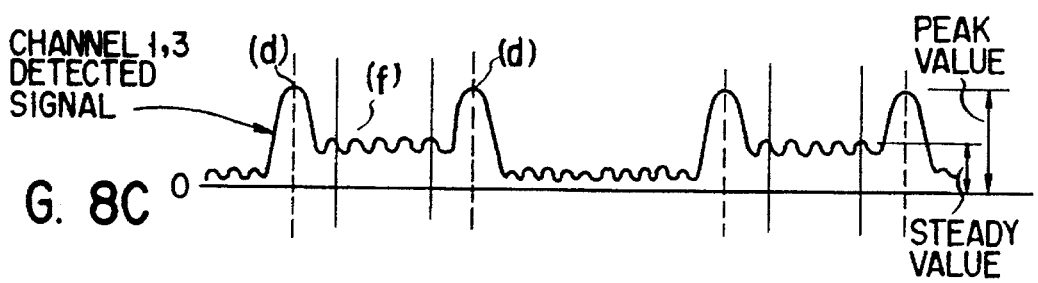
Figure 8D:
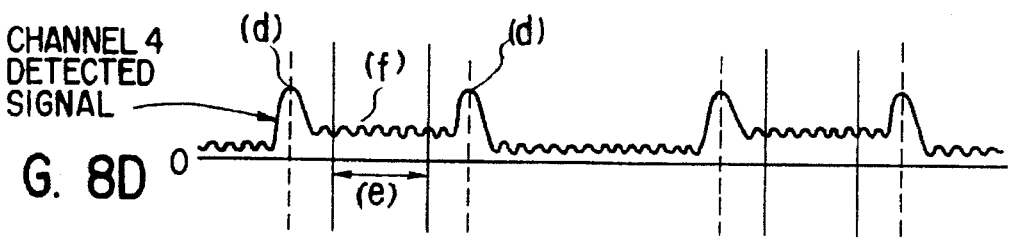

Based on this timing of the data read-out unit 7 reads out data from the predetermined memory address ranges in memory areas 1 to 4, and outputs readout data to a power arithmetic operation unit 4. At this time, when data are read out from addresses by increasing/decreasing relative addresses 261 to 360 by a predetermined address, a peak value portion (FIG. 8D) and a steady value portion (FIG. 8E) of the adjacent and alternate channels power of the burst signal can be specified. For example, the addresses of the peak value portion can be specified to be addresses near relative addresses 261 and 360, and the addresses of the steady value portion can be specified to be addresses near relative addresses 280 to 340.

The power arithmetic operation unit 4 calculates a time average of levels of digital data at the specified relative addresses, and can accurately calculate electric power of each of the peak value and the steady value of the adjacent and alternate channels power for every channel.

Therefore, according to this embodiment, when a signal to be measured is a burst signal, the peak value of the adjacent and alternate channels power which is generated at the leading/trailing edge portion of the burst signal, and the steady value of the adjacent and alternate channels power which is generated in a predetermined period in the ON duration of the burst signal can be separately measured.

Figure 2:
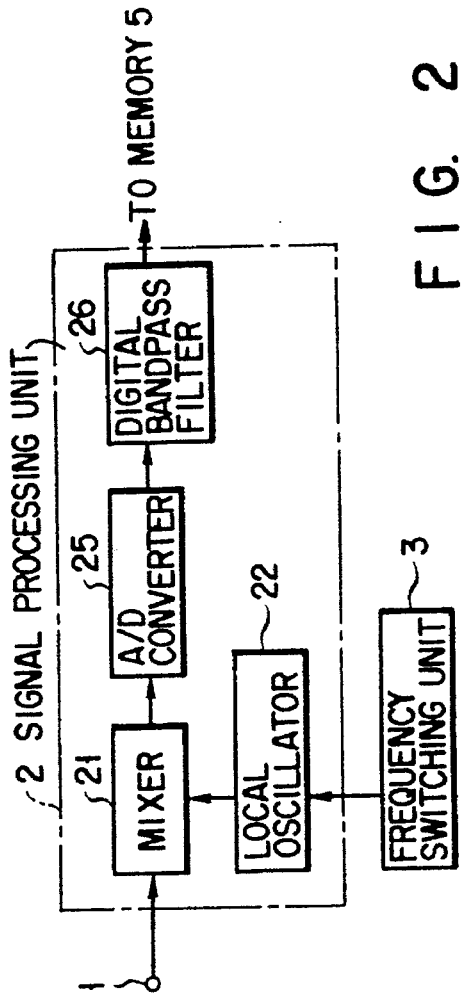
FIG. 2 is a block diagram showing another arrangement of a signal processing unit shown in FIG. 1.

Note that the arrangement of the signal processing unit 2 is not limited to that shown in FIG. 1, and may be the arrangement shown in, e.g., FIG. 2.

More specifically, the burst signal is converted by the mixer 21 and the local oscillator 22 into an IF signal of about 2 MHz, which can be directly converted into digital data by an A/D converter. This IF signal is converted into digital data by the A/D converter 25, and the digital data is input to a digital bandpass filter 26. The digital bandpass filter 26 selects signal components included in the frequency bands of the respective channels, and outputs the selected signal components to the memory 5.

Figure 3:
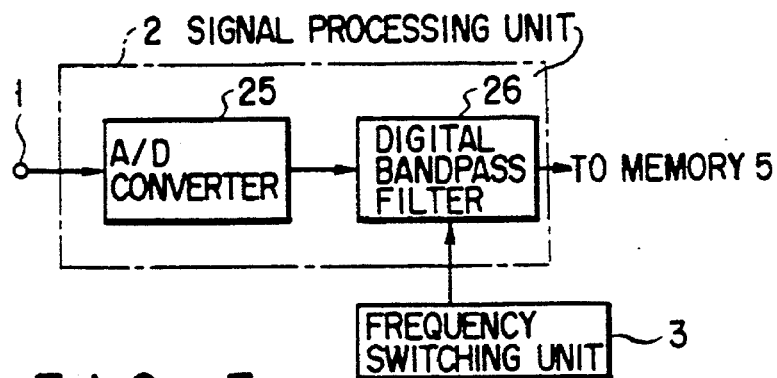
FIG. 3 is a block diagram showing still another arrangement of a signal processing unit shown in FIG. 1.
Figure 4:
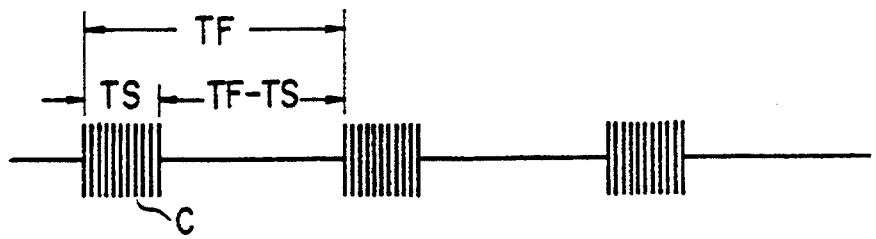
FIG. 4 is a waveform chart showing the waveform of a burst signal.

In the above embodiment (FIGS. 1 and 2), a case has been exemplified wherein a signal to be measured is a high-frequency signal (several hundreds of MHz or higher). When a signal to be measured has a frequency band which can be directly converted by an A/D converter, the signal processing unit 2 may have the arrangement shown in FIG. 3.

More specifically, the burst signal is converted into digital data by the A/D converter 25, and the digital bandpass filter 26 selects signal components included in the frequency bands of the respective channels. The frequency band to be selected by the digital bandpass filter 26 is switched by the frequency switching unit 3.

Figure 10:
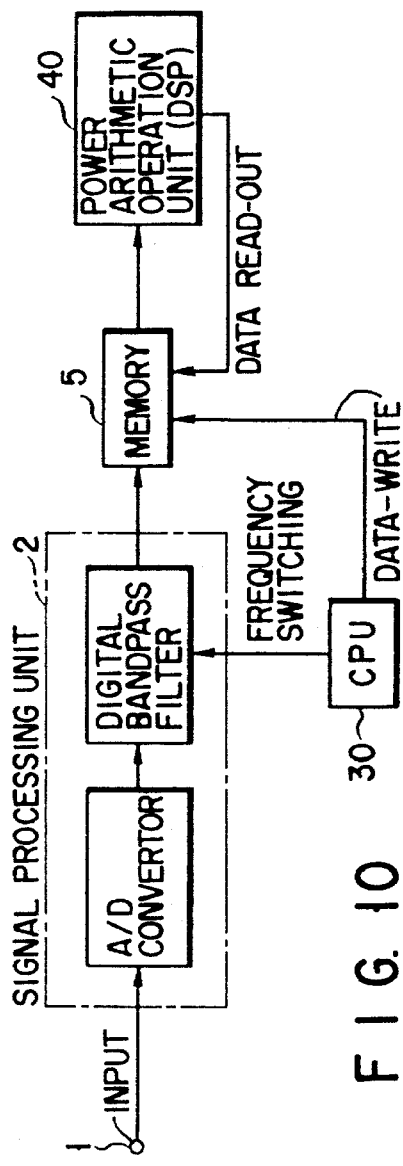
FIG. 10 is a block diagram showing the schematic arrangement according to another embodiment of the present invention.

FIG. 10 shows the arrangement used in an actual measurement device. A CPU (central processing unit) 30 is used as the frequency switching unit and the data write unit, and a DSP (digital signal processor) 40 is used as the data read-out unit and the power arithmetic operation unit.

More specifically, referring to FIG. 10, the CPU 30 controls switching of the frequency and a data write access to the memory. The DSP 40 controls a read access of digital data from the memory 5, and a power arithmetic operation, and may comprise a digital signal processor μPD77240 (available from NEC Corp.).

Figure 11:
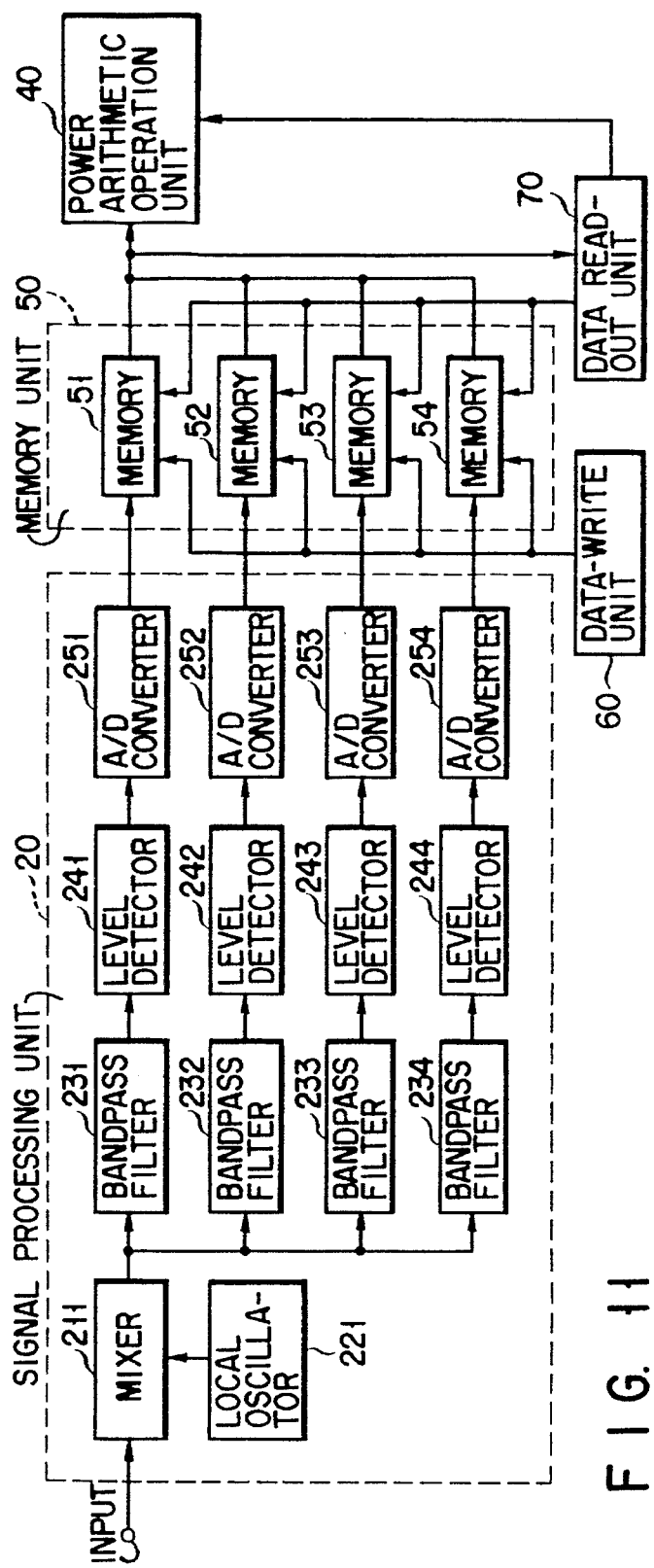
FIG. 11 is a block diagram showing the schematic arrangement according to still another embodiment of the present invention.

FIG. 11 shows the arrangement of another embodiment which does not use any frequency switching unit.

A signal processing unit 20 comprises a mixer 211, a local oscillator 221, bandpass filters 231 to 234, level detectors 241 to 244, and A/D converters 251 to 254. The unit 20 selects signal components of the main channel and adjacent and alternate channels from an input signal, and outputs the selected signal components to memories 51 to 54 in a memory unit 50 after they are converted into digital data.

The mixer 211 mixes an input signal with a local signal from the local oscillator 221 to produce an IF signal of a predetermined frequency.

The bandpass filters 231 to 234 are adjusted to have the frequency bands of the corresponding channels to be selected.

A data write unit 60 stores digital data output from the A/D converters 251 to 254 in the memories 51 to 54 at the same time (or at a predetermined time interval). More specifically, as shown in FIGS. 12A to 12F, data of channel 1 is stored at addresses 1 to 500 in the memory 51, data of channel 2 is stored at addresses 1 to 500 in the memory 52, and so on.

As a result, digital data, corresponding to the ON duration of the burst signal, of the respective channels are stored at the same addresses in the memories 51 to 54, as shown in FIGS. 12A to 12F.

Therefore, if the ON duration of the burst signal can be specified based on data in a memory area of a certain channel, the ON durations of the remaining channels can also be specified.

Upon completion of the write access to the memory unit 50, a data read-out unit 70 reads out data from the memory 52 of channel 2 (main channel), detects a memory address where data corresponding to (i) in FIG. 12C is stored, and determines the detected address to be the timing of the burst indicating the ON duration of the burst signal.

Based on this timing of the burst, the data read-out unit 70 reads out data from predetermined ranges (corresponding to the leading and trailing edge portions of the burst signal, and the predetermined period of the ON duration of the burst signal) in the memories 51 to 54, and outputs the readout data to a power arithmetic operation unit 40.

The power arithmetic operation unit 40 calculates the peak value and the steady value of adjacent and alternate channel power for every channel on the basis of data corresponding to the leading and trailing edge portions of the burst signal, and the predetermined period of the ON duration of the burst signal, which are specified based on the burst timing.

As described above, in the adjacent and alternate channels power measurement apparatus of the present invention, digital data of a channel having a carrier frequency of a signal to be measured and adjacent and alternate channels which are assigned at a predetermined frequency interval from the carrier frequency, which digital data are selected from a burst signal by a signal processing unit, and are output therefrom, are temporarily stored in memory areas of the corresponding channels, which are allocated in advance. Then, data is read out from the memory area of the channel having the carrier frequency of the signal to be measured, and the timing of the burst of the signal to be measured is specified as memory address information. Based on the memory address information, data necessary for calculating electric power are read out from the memory addresses of the respective channels. For this reason, since the memory addresses corresponding to the peak value and the steady value of the adjacent and alternate channels power can be specified for the adjacent and alternate channels, adjacent and alternate channels power generated at the leading/trailing edge portion of a burst signal to be measured, and adjacent and alternate channels power generated in a predetermined period of the ON duration of the burst signal can be separately measured.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An adjacent and alternate channels power measurement apparatus, which receives a burst signal in which ON and OFF durations of a modulated carrier repetitively appear at a predetermined time interval, and measures electric power present in a predetermined frequency band having, as a center frequency, a frequency of at least one of adjacent and alternate channels which are assigned at a predetermined frequency interval from a carrier frequency, the apparatus comprising:

a signal processing unit for receiving the burst signal, for converting, into digital data, signal components which are present in the predetermined frequency bands to have, as center frequencies, frequencies of corresponding channels in a channel of the carrier frequency and the adjacent and alternate channels from the burst signal, and for outputting the digital data;

a memory for storing the digital data output from said signal processing unit, said memory having a plurality of memory areas;

data write means for causing said memory to store the digital data in memory areas of said memory, which memory areas are allocated in advance, in correspondence with the channel of the carrier frequency and the adjacent and alternate channels;

data read-out means for causing said memory to read out the digital data from the memory area thereof which corresponds to the channel of the carrier frequency, for detecting a timing of a burst indicating an ON duration of the burst signal as memory address information, and for causing said memory to read out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by said data read-out means, and for calculating electric power in every channel, wherein said data write means causes said memory to store the digital data of the respective channels at the same relative addresses in the memory areas of said memory.

2. An adjacent and alternate channels power measurement apparatus, which receives a burst signal in which ON and OFF durations of a modulated carrier repetitively appear at a predetermined time interval, and measures electric power present in a predetermined frequency band having, as a center frequency, a frequency of at least one of adjacent and alternate channels which are assigned at a predetermined frequency interval from a carrier frequency, the apparatus comprising:

a signal processing unit for receiving the burst signal, for converting, into digital data, signal components which are present in the predetermined frequency bands to have, as center frequencies, frequencies of corresponding channels in a channel of the carrier frequency and the adjacent and alternate channels from the burst signal, and for outputting the digital data;

frequency switching means for switching the frequency bands of said signal processing unit in correspondence with the respective channels at a predetermined time interval so as to select the signal components;

a memory for storing the digital data output from said signal processing unit, said memory having a plurality of memory areas;

data write means for causing said memory to store the digital data in memory areas of said memory, which memory areas are allocated in advance, in correspondence with the channel of the carrier frequency and the adjacent and alternate channels in response to switching of the frequency bands of said signal processing unit;

data read-out means for causing said memory to read out the digital data from the memory area thereof which corresponds to the channel of the carrier frequency, for detecting a timing of a burst indicating an ON duration of the burst signal as memory address information, and for causing said memory to read out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by said data read-out means, and for calculating electric power in every channel, wherein said data write means causes said memory to store the digital data of the respective channels at the same relative addresses in the memory areas of said memory.

3. An apparatus according to claim 2, wherein said signal processing unit comprises:

a local oscillator for outputting local oscillation signals having different frequencies corresponding to the channels;

a mixer for mixing the burst signal with one of the local oscillation signals from said local oscillator, and for outputting an IF signal having a predetermined frequency;

a bandpass filter for limiting a bandwidth of the IF signal from said mixer;

a level detector for envelope-detecting an IF signal filtered by said bandpass filter; and an A/D converter for converting the detected signal output from said level detector into digital data, wherein the local oscillation signals are switched by said frequency switching means at the predetermined time interval.

4. An apparatus according to claim 2, wherein said signal processing unit comprises:

a local oscillator for outputting local oscillation signals having different frequencies corresponding to the channels;

a mixer for mixing the burst signal with one of the local oscillation signals from said local oscillator, and for outputting an IF signal having a predetermined frequency;

an A/D converter for converting the IF signal from said mixer into digital data; and a digital bandpass filter for limiting a bandwidth of the digital data from said A/D converter, wherein the local oscillation signals are switched by said frequency switching means at the predetermined time interval.

5. An apparatus according to claim 2, wherein said signal processing unit comprises:

an A/D converter for converting the burst signal into digital data; and a digital bandpass filter for limiting a bandwidth of the digital data from said A/D converter, wherein frequency bandwidths of said digital bandpass filter are switched by said frequency switching means at the predetermined time interval.

6. An adjacent and alternate channels power measurement apparatus, which receives a burst signal in which ON and OFF durations of a modulated carrier repetitively appear at a predetermined time interval, and measures electric power present in a predetermined frequency band having, as a center frequency, a frequency of at least one of adjacent and alternate channels which are assigned at a predetermined frequency interval from a carrier frequency, the apparatus comprising:

a signal processing unit for receiving the burst signal, for converting, into digital data, signal components which are present in the predetermined frequency bands to have, as center frequencies, frequencies of corresponding channels in a channel of the carrier frequency and the adjacent and alternate channels from the burst signal, and for outputting the digital data;

a plurality of memories, arranged in correspondence with the channels, for storing the corresponding digital data output from said signal processing unit;

data write means for causing said plurality of memories to store the digital data in memory areas of said plurality of memories, which memory areas are allocated in advance, in correspondence with the channel of the carrier frequency and the adjacent and alternate channels;

data read-out means for causing said plurality of memories to read out the digital data from the memory area thereof which correspond to the channel of the carrier frequency, for detecting a timing of a burst indicating an ON duration of the burst signal as memory address information, and for causing said plurality of memories to read out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by said data read-out means, and for calculating electric power in every channel, wherein said data write means causes said plurality of memories to store the digital data of the respective channels at the same relative addresses in the memory areas thereof.

7. An apparatus according to claim 6, wherein said signal processing unit comprises:

a local oscillator for outputting a local oscillation signal having a predetermined frequency;

a mixer for mixing the burst signal with the local oscillation signal from said local oscillator, and for outputting an IF signal having a predetermined frequency;

a plurality of bandpass filters for limiting a bandwidth of the IF signal from said mixer to the frequency bands corresponding to the channels;

a plurality of level detectors for respectively envelope-detecting IF signals of the respective channels filtered by said plurality of bandpass filters; and a plurality of A/D converters for converting the detected signals output from said plurality of level detectors into digital data.

8. An adjacent and alternate channels power measurement apparatus, which receives a burst signal in which ON and OFF durations of a modulated carrier repetitively appear at a predetermined time interval, and measures electric power present in a predetermined frequency band having, as a center frequency, a frequency of at least one of adjacent and alternate channels which are assigned at a predetermined frequency interval from a carrier frequency, the apparatus comprising:

a signal processing unit for receiving the burst signal, for converting, into digital data, signal components which are present in the predetermined frequency bands to have, as center frequencies, frequencies of corresponding channels in a channel of the carrier frequency and the adjacent and alternate channels from the burst signal, and for outputting the digital data;

frequency switching means for switching the frequency bands of said signal processing unit in correspondence with the respective channels at a predetermined time interval so as to select the signal components;

a memory for storing the digital data output from said signal processing unit, said memory having a plurality of memory areas;

data write means for causing said memory to store the digital data in memory areas of said memory, which memory areas are allocated in advance, in correspondence with the channel of the carrier frequency and the adjacent and alternate channels in response to switching of the frequency bands of said signal processing unit;

data read-out means for causing said memory to read out the digital data from the memory area thereof which corresponds to the channel of the carrier frequency, for detecting a timing of a burst indicating an ON duration of the burst signal as memory address information, and for causing said memory to read out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by said data read-out means, and for calculating electric power in every channel, wherein said signal processing unit comprises:

a local oscillator for outputting local oscillation signals having different frequencies corresponding to the channels;

a mixer for mixing the burst signal with one of the local oscillation signals from said local oscillator, and for outputting an IF signal having a predetermined frequency;

an A/D converter for converting the IF signal from said mixer into digital data; and a digital bandpass filter for limiting a bandwidth of the digital data from said A/D converter, wherein the local oscillation signals are switched by said frequency switching means at the predetermined time interval.

9. An adjacent and alternate channels power measurement apparatus, which receives a burst signal in which ON and OFF durations of a modulated carrier repetitively appear at a predetermined time interval, and measures electric power present in a predetermined frequency band having, as a center frequency, a frequency of at least one of adjacent and alternate channels which are assigned at a predetermined frequency interval from a carrier frequency, the apparatus comprising:

a signal processing unit for receiving the burst signal, for converting, into digital data, signal components which are present in the predetermined frequency bands to have, as center frequencies, frequencies of corresponding channels in a channel of the carrier frequency and the adjacent and alternate channels from the burst signal, and for outputting the digital data;

frequency switching means for switching the frequency bands of said signal processing unit in correspondence with the respective channels at a predetermined time interval so as to select the signal components;

a memory for storing the digital data output from said signal processing unit, said memory having a plurality of memory areas;

data write means for causing said memory to store the digital data in memory areas of said memory, which memory areas are allocated in advance, in correspondence with the channel of the carrier frequency and the adjacent and alternate channels in response to switching of the frequency bands of said signal processing unit;

data read-out means for causing said memory to read out the digital data from the memory area thereof which corresponds to the channel of the carrier frequency, for detecting a timing of a burst indicating an ON duration of the burst signal as memory address information, and for causing said memory to read out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by said data read-out means, and for calculating electric power in every channel, wherein said signal processing unit comprises:

an A/D converter for converting the burst signal into digital data; and a digital bandpass filter of limiting a bandwidth of the digital data from said A/D converter, wherein frequency bandwidths of said digital bandpass filter are switched by said frequency switching means at the predetermined time interval.

10. An adjacent and alternate channels power measurement apparatus, which receives a burst signal in which ON and OFF durations of a modulated carrier repetitively appear at a predetermined time interval, and measures electric power present in a predetermined frequency band having, as a center frequency, a frequency of at least one of adjacent and alternate channels which are assigned at a predetermined frequency interval from a carrier frequency, the apparatus comprising:

a signal processing unit for receiving the burst signal, for converting, into digital data, signal components which are present in the predetermined frequency bands to have, as center frequencies, frequencies of corresponding channels in a channel of the carrier frequency and the adjacent and alternate channels from the burst signal, and for outputting the digital data;

a memory for storing the digital data output from said signal processing unit, said memory having a plurality of memory areas;

data write means for causing said memory to store the digital data in memory areas of said memory, which memory areas are allocated in advance, in correspondence with the channel of the carrier frequency and the adjacent and alternate channels in response to switching of the frequency bands of said signal processing unit;

data read-out means for causing said memory to read out the digital data from the memory area thereof which corresponds to the channel of the carrier frequency, for detecting a timing of a burst indicating an ON duration of the burst signal as memory address information, and for causing said memory to read out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by said data read-out means, and for calculating electric power in every channel, wherein said signal processing unit comprises:

a local oscillator for outputting a local oscillation signal having a predetermined frequency corresponding to one of the channels;

a mixer for mixing the burst signal with the local oscillation signal from said local oscillator, and for outputting an IF signal having a predetermined frequency;

an A/D converter for converting the IF signal from said mixer into digital data; and a digital bandpass filter for limiting a bandwidth of the digital data from said A/D converter.

11. An adjacent and alternate channels power measurement apparatus, which receives a burst signal in which ON and OFF durations of a modulated carrier repetitively appear at a predetermined time interval, and measures electric power present in a predetermined frequency band having, as a center frequency, a frequency of at least one of adjacent and alternate channels which are assigned at a predetermined frequency interval from a carrier frequency, the apparatus comprising:

a signal processing unit for receiving the burst signal, for converting, into digital data, signal components which are present in the predetermined frequency bands to have, as center frequencies, frequencies of corresponding channels in a channel of the carrier frequency and the adjacent and alternate channels from the burst signal, and for outputting the digital data;

a memory for storing the digital data output from said signal processing unit, said memory having a plurality of memory areas;

data write means for causing said memory to store the digital data in memory areas of said memory, which memory areas are allocated in advance, in correspondence with the channel of the carrier frequency and the adjacent and alternate channels;

data read-out means for causing said memory to read out the digital data from the memory area thereof which corresponds to the channel of the carrier frequency, for detecting a timing of a burst indicating an ON duration of the burst signal as memory address information, and for causing said memory to read out signal components which are included in the frequency bands of the respective channels and correspond to digital data included in desired ranges of the burst signal from the memory areas on the basis of the memory address information of the timing of the burst; and power arithmetic operation means for receiving the digital data, which are included in the desired ranges of the burst signal, of the respective channels read out by said data read-out means, and for calculating electric power in every channel, wherein said signal processing unit comprises:

an A/D converter for converting the burst signal into digital data; and a digital bandpass filter for limiting a bandwidth of the digital data from said A/D converter.

* * * * *